Jan. 3, 1928. 1,654,926
T. J. ENGEL
TALKING MOTION PICTURE
Filed Oct. 2, 1923
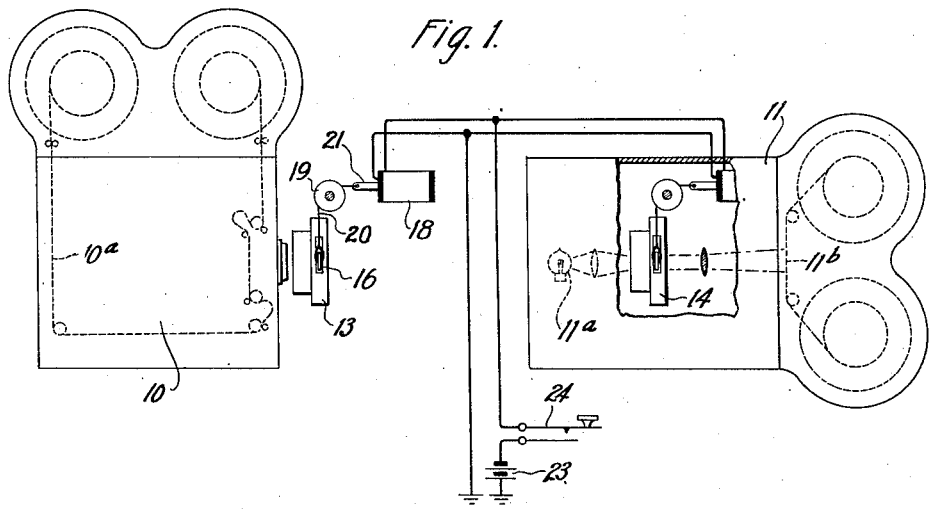
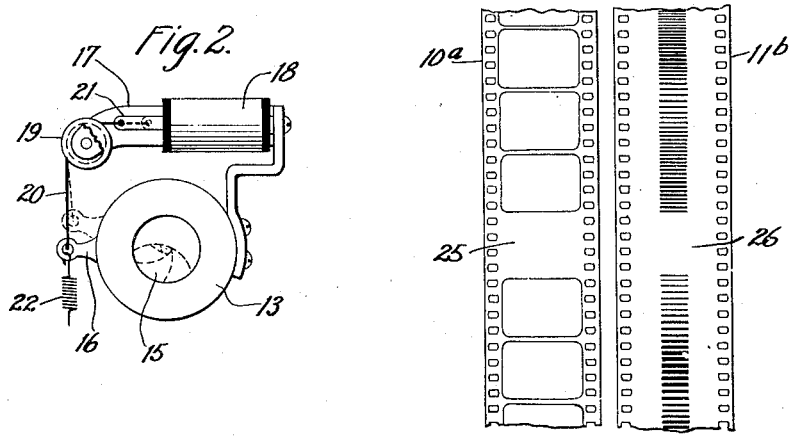
Inventor:
Theodore J. Engel
by Joel A. Palmer Att'y Patented Jan. 3, 1928.

1,654,926

UNITED STATES PATENT OFFICE.

THEODORE J. ENGEL, OF WOODSIDE, NEW YORK, ASSIGNOR TO WESTERN ELECTRIC COMPANY, INCORPORATED, OF NEW YORK, N. Y., A CORPORATION OF NEW YORK.

TALKING MOTION PICTURE.

Application filed October 2, 1923. Serial No. 666,157.

This invention relates to talking motion pictures and has for its object to coordinate the reproduction of sound and pictures from separate records.

This object is attained by photographically recording sound and pictures on separate films and under exposing corresponding portions of the films to produce blank spaces on the final records by means of which they may be matched for coordinated reproduction.

Referring now to the drawings, Fig. 1 discloses diagrammatically a photographic sound recorder and a photographic picture recorder equipped with shutters for interrupting the exposure; Fig. 2 is a detail view of the shutter and Fig. 3 shows speech and sound film records produced in accordance with the invention.

In Fig. 1, 10 represents a motion picture camera or similar photographic device for recording pictures on a continuous strip of film $10^a$ and 11 designates a photographic sound recorder wherein the intensity of a beam of light from a source $11^a$ is varied in response to sound waves to produce a record on a continuous strip of photographic film $11^b$. The means for varying the light is not disclosed as it forms no part of this invention. Arranged adjacent the lens of the camera 10 in position to control the light admitted to the camera is a shutter 13. A similar shutter 14 is provided in the sound recorder and is arranged to control the beam of light to which the sound record film is exposed.

The shutters 13 and 14 which are disclosed diagrammatically in Fig. 1 are identical and the structure thereof is shown in detail in Fig. 2. These shutters are the same as the ordinary camera shutters except that the leaves 15 have been reversed so that the shutter remains normally open instead of closed. The leaves are operated by means of a lever 16 the same as in a camera shutter, a movement of the lever in one direction being effective to cause a closure and immediate opening of the shutter, the return movement of the lever having no effect.

To effect operation of the shutter, there is supported therefrom a frame 17 on which is mounted an electromagnet 18. Also supported by the frame 17 is a pulley 19 over which is trained a wire 20, one end of which is connected to the lever 16 and the other end of which is connected to the armature 21 of the magnet 18. A spring 22 exerts tension on the lever 16 to normally retain it in the full line position to permit operation thereof to the dotted line position under the influence of the pull exerted upon energization of the electromagnet 18. A battery 23 is provided to supply electrical energy for energizing the magnets and a switch 24 is arranged in circuit with the magnets and the battery for controlling the supply of energy to the magnets.

In the recording of pictures and sound with this apparatus, the switch 24 is closed at the starting of the recording, thus simultaneously closing the shutters 13 and 14 thereby momentarily preventing exposure of the sound and picture recording films. The recording of the pictures and sound is then continued in the ordinary manner, the switch 24 being closed at intervals at the discretion of the operator thereby simultaneously closing the shutters 13 and 14 and preventing momentarily, the exposure of the films. When the films are developed there will be corresponding blank spaces 25 and 26, Fig. 3 at the beginning of each film and at intervals throughout them corresponding to the under exposures. These blank spaces are so small that they do not materially affect the reproduction of the pictures or the sound but yet are of sufficient size that the films may be coordinated by matching the corresponding blank spaces.

It is, of course, understood that various modifications may be made in the structure of this apparatus without in any way departing from the spirit of the invention as set forth in the appended claims.

The invention claimed is:

1. In combination, a motion picture camera, a sound recorder comprising a light sensitive means, a normally opened shutter for said camera and a normally opened shutter for said sound recorder, and means for simultaneously closing said shutters.

2. In combination, a motion picture camera, a sound recorder comprising a light sensitive means, a normally opened shutter for said camera and a normally opened shutter for said sound recorder, electromagnetic means for closing said shutters, and means for controlling the operation of said electromagnetic means.

In witness whereof, I hereunto subscribe my name this 27th day of September, A. D., 1923.

THEODORE J. ENGEL.